United States Patent Office 3,335,556
Patented Aug. 15, 1967

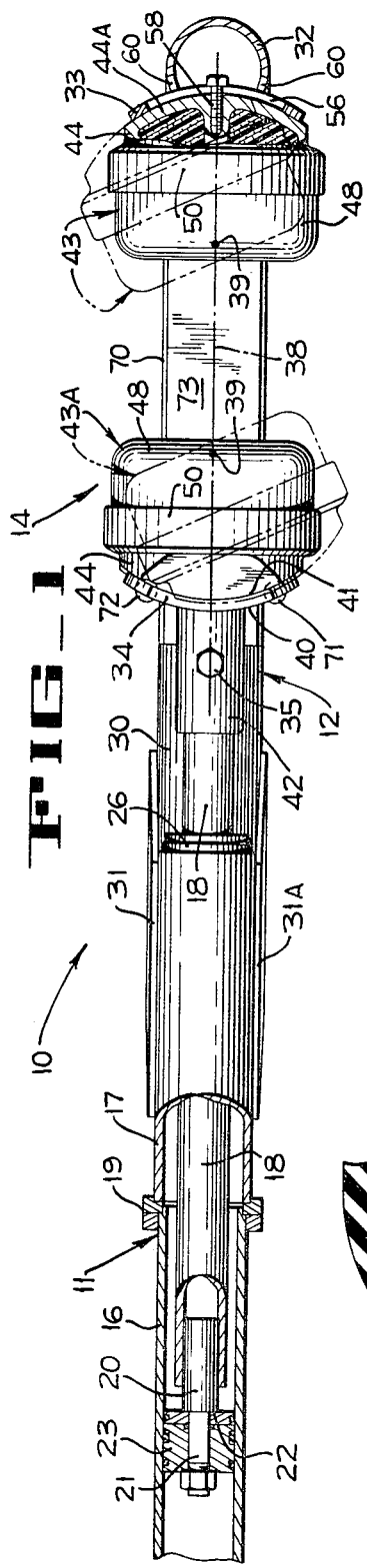

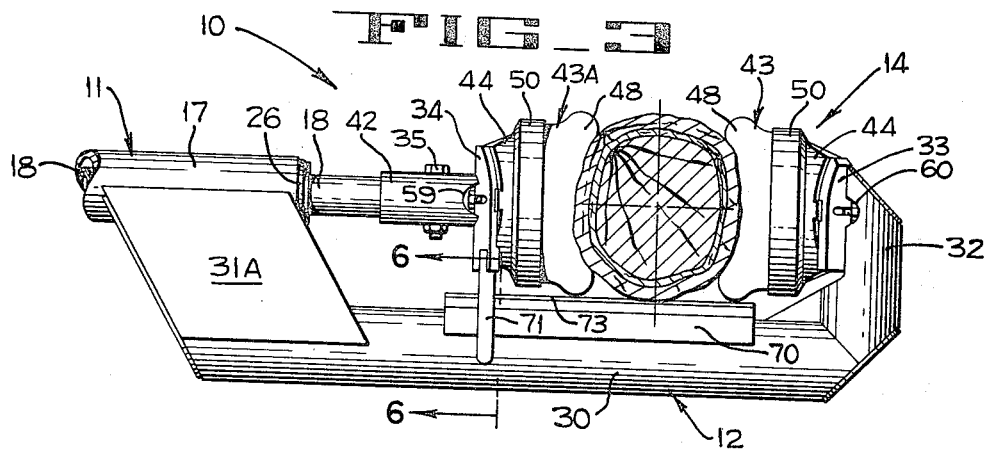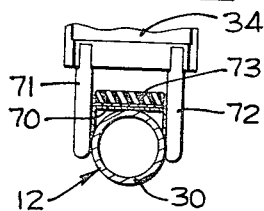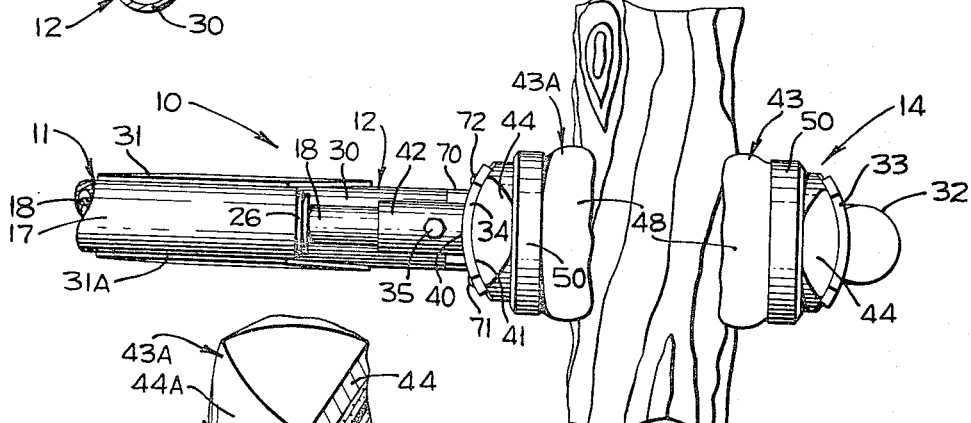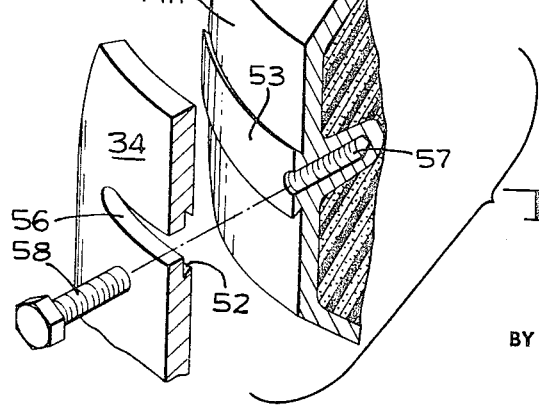

3,335,556
ARTICLE GRIPPING MECHANISM
John W. Edgemond, Jr., Oakland, Calif., assignor to FMC Corporation, San Jose, Calif., a corporation of California
Continuation of application Ser. No. 255,267, Jan. 31, 1963. This application Jan. 18, 1965, Ser. No. 432,040
11 Claims. (Cl. 56—328)

This application is a continuation of my prior pending application entitled, "Article Gripping Mechanism," filed Jan. 31, 1963, and bearing Ser. No. 255,267, now abandoned.

This invention relates to apparatus for gripping members having surface areas that are irragular and are subject to being easily bruised and more particularly to an improved apparatus for gripping the surface area of tree branches or the like.

The gripping mechanism of the present invention has general utility in the gripping of any article having an irregular surface. However, since it is particularly suited for gripping tree limbs and the like incident to a tree shaking operation, an embodiment of the mechanism adapted for gripping tree limbs will be described in detail.

In orchards, gripping of the limbs of the trees is often necessary preparatory to the removal of fruit or the like and various means have been provided to positively grasp a limb, branch or other portion of a tree. The apparatus normally employs an elevatable boom which is equipped at its free end with a gripping device by which a desired tree member may be grasped without undue stresses being placed on such member. After gripping such member, a reciprocating mechanism is actuated to rapidly reciprocate the boom longitudinally of its length to shake the tree member and dislodge the fruit. The engagement of the device with the tree should be such that damage to the bark surface is prevented during the grasping of the bark and during the application of the reciprocating vibratory motion to the boom. Further, the positive engagement of the gripping device with the tree should assure substantially complete transfer of the vibratory motion of the boom to the tree member.

An object of the present invention is to provide an improved apparatus for gripping articles having irregular surfaces.

Another object of the present invention is to provide a tree gripping apparatus of simple construction which can be readily attached to opposed bark surface areas of a tree member.

Another object of the invention is the provision of a tree gripping device for attachment to opposite surface areas of a tree member wherein the positive grasping force can be applied longitudinally along the boom means and through said opposed surface areas to prevent damage to the surface areas.

Another object is to provide a gripping mechanism capable of applying uniform pressure to all gripped areas of the object being processed.

Another object of the present invention is to provide a tree gripping device adapted to be attached to opposed bark surface areas of a tree member in a manner such that the positive grasping force is uniformly distributed over the grasped opposite bark surface areas to prevent damage to the bark surface area.

Another object of the present invention is to provide a tree gripping device wherein the positive grasping of nonuniform opposed surface areas is efficiently accomplished by clamping mechanisms that have article-gripping members having the characteristics of deformability, non-stretchability and resiliency.

Another object of the present invention is to provide a guide means on the tree gripping device in combination with opposed gripping members, the guiding means being arranged to assist the contacting means in properly grasping opposed surface areas of a tree member.

Another object of the present invention is to provide a tree gripping device, adapted to be attached to opposed bark surface areas of a tree member, in which the vibratory movement of a boom is transmitted to the tree member without damage thereto for the removal of fruit or the like.

Other objects, features and advantages of the invention will be apparent from the following detailed description, reference being made to the annexed drawings in which:

FIGURE 1 is a top plan, partly in section, of the apparatus of the present invention.

FIGURE 2 is a side elevation, partly in section, of the apparatus of FIG. 1.

FIGURE 3 is a diagrammatic elevation, showing one operative position of the apparatus.

FIGURE 4 is a diagrammatic top plan of the apparatus of FIG. 3.

FIGURE 5 is an enlarged, fragmentary, exploded perspective of a portion of the tree gripper head.

FIGURE 6 is a vertical section taken on line 6—6 of FIG. 3.

FIGURE 7 is an enlarged fragmentary section of the portion of the gripper head enclosed by the phantom circle in FIG. 2.

The embodiment of the invention chosen for disclosure in the present application comprises, in general, an elevatable boom having a power actuated clamping or grasping means mounted at its outer free end. The clamping means is in the form of a pair of identical gripper heads or cushion members arranged to positively grasp opposite bark surface areas of a tree limb or the like.

The gripper heads are carried in a manner such that limited planar movement in an arcuate path relative to the boom is permitted to allow the heads to effectively grasp a tree limb even if the boom is not disposed at right angles to the limb. The gripper heads are of a composite construction and include a flexibly deformable, resilient, and non-stretchable outer cap, and a base portion connected thereto to enclose a non-compressible flowable material which is under pressure during gripping of the tree limb. The construction of the heads is such that they flex and yield to automatically accommodate themselves to the surfaces being gripped and thereby establish gripping engagement with a predetermined surface area. When a uniform engagement has been made and the boom is vibrated, the heads do not yield further, since they are made of non-stretchable material. Rather, they maintain engagement over the same area while acting as substantially rigid members to transmit the vibratory movement of the boom to the limb.

Referring to the drawings, the illustrated embodiment 10 of the tree gripping device of the present invention comprises a boom 11, a frame member 12 secured to the free end of the boom, and a clamping unit 14 movably secured to and forming an extension of the free end of the boom 11. The end of the boom 11 comprises hollow cylindrical sections 16 and 17 secured together by a bolted flange connection 19 of conventional construction, and the clamping unit 14 has a portion movably supported within these sections 16 and 17. A longitudinal hollow, clamp actuating tube 18 of the clamping unit 14 extends within the boom 11 and has a rod 20 connected thereto at one end. The rod 20 is provided with a reduced portion 21 which has a threaded end adapted to receive a nut and washer to secure a piston assembly 23 against a shoulder 22 formed between the main portion of the rod and its reduced portion 21. The piston assembly 23 is slidable along the internal cylindrical surface of the boom section 16. Suitable means, connected to the boom 11, are provided to selectively direct fluid under pressure to either side of the double acting piston assembly 23 within the section 16 to slidably move the clamping means 14 in opposite directions. The fluid supply means may take the form of flexible conduits such as conduit 27 (FIG. 2) which has a threaded connector 28 communicating with an aperture in the wall of the cylindrical section 17 to direct pressurized fluid to one side of the piston assembly 23.

The end of the boom through which the rod 18 extends is sealed by an O-ring 24 disposed in an annular groove 25 formed between an inwardly projecting flange 26A of a sleeve 26 and a bushing 29. The sleeve 26 is welded to the end of the boom section 17 and the bushing 29 is pressed in the sleeve 26.

The frame 12 is a generally C-shaped member (FIG. 2), and includes a longitudinally extending tube 30 to one end of which two spaced plates 31 and 31A are welded. To the opposite end of tube 30, a laterally projecting hollow member 32 is welded, said member including an arcuate mounting plate 33. The spaced plates 31 and 31A are provided with cross braces 36 and are welded to the boom section 17 so that the entire C-shaped frame is supported on the boom.

The forward end of the clamping means 14 includes an arcuate support plate 34 having forward and rearward parallel arcuate surfaces 40 and 41, respectively. The support plate 34 is secured to a short tubular memer 42 in a suitable manner, such as by welding, said tubular member 42 being secured to the forward end of the clamp actuating tube 18 by a bolt and nut fastener assembly 35 passing through aligned transverse openings in the telescoping tubes 42 and 18. It is to be noted that the arcuate mounting plate 34 is directly opposite the arcuate mounting plate 33 on the end of the C-shaped frame 12, and that the plate 33 is identical to plate 34 but is facing in an opposite direction.

A gripper head or cushion member 43 is mounted on the support plate 33 and an identical gripper head 43A is mounted on the support plate 34. Since the heads are identical, only head 43 (FIG. 2) will be described in detail. The head 43 includes a rigid cup-shaped base 44, preferably made of metal, which includes a rear wall 44A having an outer arcuate surface that is curved to fit snugly in the arcuate mounting plate 33 in slidable engagement therewith. The base 44 terminates in a generally cylindrical portion 45 in which an annular recess 46 is formed. A cup-shaped cap 48 is secured to the base 44, said cap having an annular flange 49 locked in the recess 46 of the base 44 by means of metal clamping band 50 which may be of any suitable commercial type provided with means for drawing the band tightly down on the flange of the cap. It will be noted that the cup-shaped cap and the cup-shaped base cooperate to define a closed and sealed chamber in which a filler 51, which will be described presently, is disposed.

The cap 48 is made of a material that is sufficiently flexible to permit the cap to automatically adapt itself to the configuration of the tree. In addition, the material must be non-stretchable since it must act as an unyielding member to transmit the forces generated by the boom.

One suitable material for the cap 48 is rubber in which several layers or plys of nylon, rayon, cotton or a similar mesh fabric has been molded. In order to adapt each layer of fabric for positioning in a cup-shaped mold, segments are cut from spaced points around the periphery of a circular piece of fabric, giving the fabric a cruciform configuration with the center portion substantially the size of the base of the mold. The wings of the fabric may then be folded up to form the sides of the reinforcing layer. One gripper head, that has been successfully tested, was equipped with caps made of tire grade rubber synthetic or natural and according to a pneumatic tire tread formula in which four layers of cotton cording was embedded, the cording of each layer being oriented at right angles to the cording of the adjacent layer. The head was formed in a mold in which the rubber was cured to a reading of 40–60 on Scale A of a Shore durometer. Each cap was approximately six inches in diameter and had a wall thickness of about ¼″. The caps should, of course, be resilient to the extent that they are capable of returning to their original, generally cylindrical configuration, substantially as shown in FIGS. 1 and 2, after they are moved out of gripping engagement with the three limb.

The filler 51, that is disposed within the chamber enclosed by the cap and the base, must be capable of yielding to permit the cap to assume tree-gripping position and must be substantially non-compressible so that it is capable of transmitting the forces generated by the boom. Further, the filler 51 must be capable of flowing, as a liquid under pressure flows so that, when the gripper head 43 is grasping an article, it will exert a uniform pressure on all areas that are gripped. This gripping action is made possible by the fact that fluids under pressure exert constant pressure in a direction normal to all surfaces of confinement. In addition, the pressure of the filler in the chamber induces a tension in the membrane serving to rigidize the filler, the membrane, and the base together as a unit. Accordingly, many fluids, such as liquids, greases, silicones, rubber and even small steel balls, each ball having a diameter of between ⅛ and ¹⁄₁₆ of an inch, are suitable for this service. In the above-mentioned tested gripper head, a low carbon block reinforcement content, gum rubber was employed as the filler. This rubber had a Scale A Shore durometer reading of 18–25 and was substantially homogeneous, void-free in structure. Further, in another tested gripper head, the portion of the chamber that is enclosed by the base 44 was filled with tar and the remainder of the chamber within the cap 48 was filled with the preferred filler material, namely, the above-mentioned low durometer rubber in which the rubber was bonded by an adhesive to the inside surface of the cap. This 2-part filler arrangement is illustrated in FIG. 2. Tar acts as a rigid, inelastic body under rapid, cyclic stresses.

It is not always possible to position the boom at right angles to the tree limb that is to be vibrated. To allow the gripper heads to adapt themselves to the limb when the boom is at such an angle, each of the support plates 33 and 34 is provided with a transverse dovetail groove 52 (FIG. 5) formed in its forward arcuate surface 41. The groove 52 receives a correspondingly curved dovetail flange 53 which is formed on the rear wall 44A of the base 44.

The arcuate movement of each head is limited by a longitudinally extending transverse slot 56 which extends through the support plate and is in alignment with and extends to the groove 52. A tapped hole 57 is provided in the base 44 at the area of the dovetail flange 53 to receive a set screw 58 as shown in FIGURES 2 and 5 that moves with the head and engages the end extremities of the longitudinal slot 56 to limit the free planar arcuate movement of the head relative to the associated support plate. Further, it is to be noted that opposite clearance openings 59 (FIG. 2) are provided in the tubular member 42 to which support plate 34 is secured to permit passage of the set screw 58 during swinging movement of the gripper head. Similar openings 60 (FIG. 1) are provided in the laterally projecting member 32 of the C-frame to which the support plate 33 is secured.

The arcuate surface 41 of each pad is formed on an arc of a circle and the radius of the circle is chosen so that the center of the circle, indicated by the dot 39, lies substantially on the longitudinal axis 38 of the boom. When each pad is in engagement with the limb of a tree, the central contacting area of the pad will be substantially at point 39.

Thus, even though the gripper heads 43 and 43A adjust to different angular positions in gripping opposed surface areas of a tree member, as illustrated in phantom lines, FIG. 1, the central gripping area of the pads always lie on the axis 38. Thus, even though the boom is not disposed at right angles to the tree member, the forces transmitted through the gripper heads will lie on axis 38 and be directed longitudinally of the boom. Therefore, no undesirable movements will be set up which would tend to twist the heads out of contact with the tree member, and the forces generated by the boom will be transmitted to the tree member with maximum efficiency.

In order to prevent rotation of the gripper head 43A about the axis of the boom, a guide 70 (FIG. 6) formed of two back-to-back channels, is mounted on the upper surface of the longitudinal tube 30 of the C-frame 12. A pair of short rods 71 and 72 are welded to the support plate 34 and extend downwardly to opposite sides of the guide 70. A pad 73 of cushioning material, such as rubber, may be secured to the upper surface of the guide 70 to prevent damage to the tree limb when the heads are being positioned on opposite sides thereof.

It should be noted that, at the beginning of a tree-gripping operation when the boom is maneuvered to position the limb between the gripper heads, the rubber pad and the guide 70 may act as a positioning member since, when the limb engages the guide 70, it is automatically positioned between the heads. Then when the head 43A is moved toward the head 43 and the limb is clamped therebetween, it will be effectively gripped by the two cushion heads and the resilient pad.

To put the gripper mechanism of the present invention into operation, pressurized fluid is directed through conduit 27 to the inside of the boom on one side of piston 23, causing the head 43A to be moved away from head 43. The operator then maneuvers the boom to bring the tree limb that is to be gripped, into contact with the resilient pad 73 whereby the limb is automatically disposed between the gripper heads. The pressurized fluid is then directed to the other side of piston 23 causing the head 43A to move toward head 43 to contact the tree limb and lock it in place between the heads.

As previously mentioned, as each head moves into gripping engagement with the limb, both the cap 48 and the filler yield to adapt the head to the contour of the limb. When the limb has been tightly gripped, no further yielding of the head occurs. Rather, the head thereafter acts as a substantially rigid member to transmit the vibrations of the boom to the limb.

Since each cap 48 is made of material that is substantially non-stretchable, the contact area between the head and the limb remains substantially constant.

It will be evident that the boom could be manually vibrated or that any commercial boom vibrating mechanism could be used such as that used in the Model LPS tree shaking mechanism manufactured by Gould Bros. Inc. of Milpitas, California.

While specific materials have been disclosed for the cap 48 and the filler of the gripper heads, it will be understood that any materials may be used that have the above-mentioned characteristics, namely, the material of the cap must be yieldable, non-stretchable, and resilient enough to return to its original shape. The filler material must have the flow characteristics of a liquid and must be substantially non-compressible. The materials of the cap and filler of the gripper head must be capable of transmitting to the gripped tree limb the vibratory movement of the boom without dampening.

It will be understood that further modifications and variations may be effected without departing from the present invention which is only limited by the scope and proper interpretation of the appended claims.

Having thus described my invention, what I claim as new and desire to protect by Letters Patent is:

1. In a shaker mechanism, an axially reciprocable boom, article clamp means carried on the outer end of said boom and including a pair of opposed yieldable gripper heads, each of said gripper heads including a rigid base, and a substantially inextensible but flexible cup-shaped cap, said cap and base defining a central chamber, a filler of substantially incompressible, but flowable material completely filling said chamber, and means for effecting relative movement between said heads to cause said heads to grip an article to be shaken, each of said gripper heads auomatically adjusting itself to the article contour with said filler directly transmitting movement of said boom to the article during reciprocation of the boom, the volume of said chamber remaining substantially constant.

2. The shaker mechanism of claim 1, wherein said filler material is rubber.

3. The shaker mechanism of claim 1, wherein said filler is a liquid.

4. The shaker mechanism of claim 1, wherein said fillers is made up of steel balls having a diameter in the range of from $\frac{1}{16}$ to $\frac{1}{8}$ inch.

5. The shaker mechanism of claim 1, wherein said filler is a silicone.

6. In a shaker mechanism, an axially reciprocable boom, article clamp means carried on the outer end of said boom and including a pair of opposed yieldable gripper heads each of said gripper heads including a rigid base, and a substantially inextensible but flexible cap, said cap and base defining a central chamber, a substantially incompressible but flowable material contained within said chamber and generally occupying a fixed volume, and means for effecting relative movement between said heads to cause said heads to grip an article to be shaken, each of said gripper heads automatically adjusting itself to the article contour with said filler directly transmitting reciprocation of said boom to the article during reciprocation of the boom, the volume of said chamber during gripping of an article being completely filled by said material.

7. The shaker mechanism of claim 6 wherein said material is comprised of ball-like particles.

8. The shaker mechanism of claim 6 wherein said material is a liquid.

9. The shaker mechanism of claim 6 wherein said material is rubber.

10. The shaker mechanism of claim 6 wherein said volume in said chamber is completely filled with said material prior to gripping of an article to be shaken.

11. In a tree shaker, an elongate, axially reciprocable boom, opposed, relatively movable tree gripper heads on said boom, said gripper heads and associated boom portions forming a laterally opening, C-shaped tree receiving opening, and means for effecting relative movement between said heads for gripping a tree; each of said gripper heads comprising rigid base means, a substantially inextensible but flexible tree engaging and accommodating member with said member including a fabric ply, and a filler of flowable material of the type which is substantially incompressible when confined by said tree engaging member, each of said flexible tree engaging members automatically adjusting itself to accommodate the tree contour during gripping with the filler material flowing, without change in material volume; said filler material completely filling the member during gripping and being confined during gripping for transmitting shaking forces from said base means to the inner side of the tree engaging member and hence on to the tree, during reciprocation of said boom.

References Cited

UNITED STATES PATENTS

| | | | |
|---|---|---|---|
| 530,733 | 12/1884 | Tower | 269—261 |
| 2,268,262 | 12/1941 | Miller | 100—211 X |
| 2,357,867 | 9/1944 | Babbitt et al. | 100—211 X |
| 2,632,215 | 3/1953 | Lee | 100—211 X |
| 3,163,458 | 12/1964 | Brandt | 56—328 X |

FOREIGN PATENTS 388,891   3/1933   Great Britain.

ABRAHAM G. STONE, *Primary Examiner.*

M. C. PAYDEN, P. A. RAZZANO, *Assistant Examiners.*